United States Patent

Inoue et al.

[11] Patent Number: 5,852,484
[45] Date of Patent: Dec. 22, 1998

[54] LIQUID CRYSTAL DISPLAY PANEL AND METHOD AND DEVICE FOR MANUFACTURING THE SAME

[75] Inventors: Kazuo Inoue; Tsuyoshi Uemura; Junji Nakajima, all of Osaka, Japan

[73] Assignee: Matsushita Electric Industrial Co., Ltd., Osaka, Japan

[21] Appl. No.: 863,218

[22] Filed: May 27, 1997

Related U.S. Application Data

[62] Division of Ser. No. 533,149, Sep. 25, 1995.

[30] Foreign Application Priority Data

Sep. 26, 1994 [JP] Japan ................................. 6-229316

[51] Int. Cl.⁶ ..................... G02F 1/1333; G02F 1/137
[52] U.S. Cl. ............................................. 349/86; 349/122
[58] Field of Search ..................... 349/86, 90, 91, 349/92, 93, 122, 153, 154

[56] References Cited

U.S. PATENT DOCUMENTS

| | | | |
|---|---|---|---|
| 3,990,782 | 11/1976 | Yamasaki | 349/190 |
| 4,094,058 | 6/1978 | Yasutake et al. | 349/153 |
| 4,640,583 | 2/1987 | Hoshikawa et al. | 349/153 |
| 5,106,441 | 4/1992 | Brosig et al. | |
| 5,176,140 | 1/1993 | Kami et al. | |
| 5,178,571 | 1/1993 | Mase | |
| 5,361,152 | 11/1994 | Harada et al. | 349/153 |
| 5,426,522 | 6/1995 | Takahara et al. | |
| 5,430,563 | 7/1995 | Bouteiller et al. | 349/93 |
| 5,474,629 | 12/1995 | Yamazaki et al. | |
| 5,552,913 | 9/1996 | Shimizu et al. | 349/153 |
| 5,566,008 | 10/1996 | Yoshida et al. | |
| 5,568,297 | 10/1996 | Tsubota et al. | |
| 5,595,620 | 1/1997 | Takei | |
| 5,617,228 | 4/1997 | Watanabe et al. | |
| 5,635,259 | 6/1997 | Tahara et al. | 349/153 |

FOREIGN PATENT DOCUMENTS

| | | |
|---|---|---|
| 61-190313 | 8/1986 | Japan |
| 4-37820 | 2/1992 | Japan |
| 4-60518 | 2/1992 | Japan |
| 5-5890 | 1/1993 | Japan |
| 5-5892 | 1/1993 | Japan |
| 5-5893 | 1/1993 | Japan |
| 6-102498 | 4/1994 | Japan |
| 6-235925 | 8/1994 | Japan |

*Primary Examiner*—Hung X. Dang
*Assistant Examiner*—Tai V. Duong
*Attorney, Agent, or Firm*—Merchant, Gould, Smith, Edell, Welter & Schmidt, P.A.

[57] ABSTRACT

A mixed material of liquid crystals and resin is dropped on at least one substrate in an amount greater than the amount needed to cover a display area for the LCD panel. The substrate is adhered to another substrate, and excess material is removed to the outside of a display area. The phase-separation of the liquid crystals and resin is carried out by irradiating light while pressure is added to at least one substrate, so that a liquid crystal display panel applied to a liquid crystal display device or a light shutter can be manufactured without applying a complex vacuum device.

6 Claims, 15 Drawing Sheets

LIQUID CRYSTAL DISPLAY PANEL AND METHOD AND DEVICE FOR MANUFACTURING THE SAME

This is a Divisional of application Ser. No. 08/533,149, filed Sep. 25, 1995, which application(s) are incorporated herein by reference.

FIELD OF THE INVENTION

This invention relates to a liquid crystal display panel applied to a liquid crystal display device or a light shutter, and further relates to a method and a device for manufacturing the same.

BACKGROUND OF THE INVENTION

Since a liquid crystal display panel can be thinned, lightened and driven with low voltage, the panel has been applied to wrist watches, calculators, personal computers, personal word processors, and the like. However, the color and contrast of a twisted nematic (TN) liquid crystal panel or a super-twisted nematic (STN) liquid crystal panel varies, depending on the direction from which the liquid crystal panel is viewed. In a polymer dispersed liquid crystal (PDLC) panel, liquid crystal molecules are dispersed in a resin matrix between glass substrates to which electrodes are fixed, or a resin matrix is placed in a liquid crystal in a particle or network condition. When voltage is not applied, the liquid crystal molecules are oriented randomly. Hence, there is a difference between the refractive index of the resin and that of the liquid crystal molecules, thus scattering light (FIG. 12A). On the other hand, the liquid crystal molecules orient toward the direction of electric field with the application of voltage, so that the refractive index of the liquid crystal molecules becomes the same as that of the resin and light transmits (FIG. 12B). Therefore, the PDLC panel has high transmissivity and constant color and contrast without being influenced by the direction from which the panel is viewed.

A vacuum deposition method is known as a conventional method of manufacturing a liquid crystal display panel. In this method, glass substrates to which a pair of electrodes are fixed are washed, and a resin seal is then formed on the edge of one substrate (one section of the seal is left open for injection). In order to maintain a predetermined gap, spacers are dispersed on the other substrate. Then, the substrates are fixed to each other, and the resin seal is cured by heating. The panel is placed in a vaccum container in order to keep a vacuum inside the panel. An injection mouth is set in contact with the liquid crystal, and the liquid crystal is then injected into the panel by changing pressure to a normal level.

However, when a highly volatile material is used in the conventional method, the composition of the material changes in the process. Thus, a complex vacuum device is necessary to keep a vacuum inside the panel. It also takes a long time to generate a vacuum condition in the container, so that the productivity of the panels is low.

Conventional methods were proposed which include a method of dropping liquid crystals on a substrate after forming a sealing resin on the substrate and of pressing the resin so as to cure it (Published Unexamined Japanese Patent Application (Kokai) No. Sho 61-190313, Kokai No. Hei 5-5892 and Kokai No. Hei 5-5893), a method of forming a ringed two-layered adhesive seal (Kokai No. Hei 5-5890), a method of dropping liquid crystals in an amount greater than the required amount on one substrate and of sticking substrates to each other in vacuum, while adding pressure to the substrates so as to remove excess liquid crystals through an exhaust section (Kokai No. Hei 6-235925), and a method of coating a mixed material of polymer and liquid crystals on a substrate applied with a sealing material or on another substrate and of carrying out both seal cure and the phase-separation PDLC after adhering the substrates to each other (Kokai No. Hei 4-37820). In Kokai No. Sho 61-190313, the cut surface of the substrates is sealed after pressing the substrates so as to provide a uniform gap. However, excess liquid crystals are liquid and the seal is in an uncured condition, so that the substrates are likely to slide on each other when the seal comes in contact with the liquid crystals. In this invention, on the other hand, the mixed material of liquid crystals and resin is cured when pressure is added to the substrates, so that the substrates do not slide.

In Kokai No. Hei 5-5892, Kokai No. Hei 5-5893 and Kokai No. Hei 5-5890, a pore is formed so as to remove liquid crystals, and a sealing material is cured by adding pressure after removing excess liquid crystals. However, the pore is open when the sealing material is cured, and air bubbles may enter between substrates when pressure is set back to the normal level. The substrates also bulge when pressure returns to the original level, and a precise gap cannot be formed. In this invention, the mixed material between the substrates is cured while pressure is added to the panel, so that no air bubbles enter and a precise gap is formed.

Particularly in Kokai No. Hei 5-5890, air bubbles remain between the first and second seals. In addition, since liquid crystals are liquid, remaining air bubbles enter a display area. However, since the mixed material of liquid crystals and resin is cured in this invention, no air bubbles enter the display area.

Unlike in this invention, the phase-separation of liquid crystals and resin is not carried out while adding pressure to a panel in Kokai No. Hei 4-37820 and Kokai No. Hei 6-235925. In particular, Kokai No. Hei 6-235935 is different from this invention in that the panel is placed in a vaccum.

SUMMARY OF THE INVENTION

It is an object of this invention to solve the above-mentioned conventional problems by providing a liquid crystal display panel having liquid crystal sandwiched between substrates, and a method and device for manufacturing the liquid crystal display panel. Liquid crystals and resin, or the mixture of liquid crystals and resin, are easily injected between the substrates without applying a complex vacuum device. A highly volatile material can also be injected between the substrates. Compared with the conventional vacuum injection method, the time required for manufacturing liquid crystal display panels is significantly reduced in this invention.

In order to achieve this object, the liquid crystal display panel of this invention includes resin and liquid crystals sandwiched between substrates. A film is formed on one section of at least one substrate. A material sealed in the panel has a larger contact angle on the film than a contact angle on a central section of a display area where the film is not formed. The resin and the liquid crystals are in a phase-separation condition.

It is preferable that the film is formed on the edge of the substrate.

It is also preferable that the film is formed on the edge of the display area.

It is further preferable that the film is made of thermoplastic resin.

It is preferable that the phase separation of the resin and the liquid crystals is carried out by irradiating light while pressure is added to at least one substrate.

It is also preferable that the resin is photosetting resin.

The liquid crystal display panel of the second aspect of this invention includes a pair of substrates, resin and liquid crystals. The resin and the liquid crystals are sandwiched between the substrates. Sealing resin is continuously formed at a peripheral section of at least one of the substrates so as to adhere the substrates to each other. The resin and the liquid crystals are in a phase-separation state.

The liquid crystal display panel of the third aspect of this invention includes a pair of substrates, resin and liquid crystals. The resin and the liquid crystals are sandwiched between the substrates. The sealing resin is formed intermittently outside of a picture element; and the resin and said liquid crystals are in a phase-separation state.

It is also preferable that the sealing resin is formed in at least two lines, that at least one of the two lines is formed continuously at a peripheral section of at least one of the substrates, and that at least one of the two lines is formed intermittently outside of a picture element.

It is further preferable that the liquid crystal display panel further includes a guide path for guiding a part of the sealing resin to the outside of the panel.

The method of manufacturing a liquid crystal panel of the invention includes the steps of:

dropping liquid crystals and resin or a mixed material of liquid crystals and resin onto at least one substrate in an amount greater than the amount needed to cover the display area when the substrates are sealed;

adhering one substrate to the other substrate;

removing excess liquid crystals to the outside of a display area; and carrying out the phase separation of the liquid crystals and the resin by irradiating light while pressure is added to at least one substrate.

It is preferable that light is first irradiated to the peripheral section of the display area so as to carry out the phase separation of the liquid crystals and the resin, and then to the display area in order to carry out the phase separation of the liquid crystals and the resin inside the display area.

It is preferable that a film is formed before the liquid crystals and the resin or the mixed material of liquid crystals and resin are dropped. The material sealed in the liquid crystal panel has a larger contact angle on the film than a contact angle on a central section of the display area where the film is not formed.

It is also preferable that the film is formed on the edge of the substrate.

It is further preferable that the film is formed on the edge of the display area.

It is preferable that the film is made of thermoplastic resin.

It is preferable that the liquid crystals and the resin or the mixed material are sealed between the substrates by dropping the liquid crystals and the resin or the mixed material on at least one substrate, by reducing pressure while the liquid crystals and the resin or the mixed material are in contact with the other substrate, and by adhering the substrates to each other.

It is also preferable that the phase separation of the liquid crystal and the resin is carried out by irradiating light only inside the display area.

It is further preferable that the phase separation of the liquid crystal and the resin is carried out, and the cut surface or a section of the cut surface of the substrates is then sealed after the liquid crystal panel is cut.

It is preferable that the liquid crystals and the resin or the mixed material of liquid crystals and resin are sealed between the substrates by dropping the liquid crystals and the resin or the mixed material on the end section of a first substrate, by placing a second substrate so as to set it in contact with the liquid crystals and the resin or the mixed material, by gradually sliding down the second substrate with a contacting section at the center, and by adhering the first and the second substrates to each other.

It is preferable that the resin is photosetting resin.

The device for manufacturing a liquid crystal panel includes a means of sandwiching liquid crystals and resin or a mixed material of liquid crystals and resin between two substrates while pressure is added to the substrates at a constant level, and a means of placing a light scattering medium on at least one of the substrates and irradiating light from a light scattering medium side so as to carry out the phase separation of the liquid crystals and the resin.

It is preferable that light is irradiated from the light scattering medium side while a buffer is placed on the other substrate and the liquid crystal panel is pressed with a light transmitting film from the light scattering medium side.

It is also preferable that the resin is photosetting resin.

In the method of this invention, the liquid crystals and the resin can be sealed in-between the substrates simply by dropping a drop of liquid crystals and resin and adhering the substrates, so that a complex vacuum device for keeping the liquid crystal panel in a high vacuum atmosphere is not necessary. Thus, compared with the vacuum injecting method, the time required for manufacturing is significantly reduced and a highly volatile material does not change its composition by being sealed in-between the substrates.

Since the resin and the liquid crystals are in a phase-separation state, the liquid crystals have a diameter of only about 1–2 $\mu$m.

The phase separation of the liquid crystals and the resin is carried out by the irradiation of light, and the substrates can also be sealed by irradiating light without applying sealing resin. Therefore, the time required for curing is shortened, and the washing process of the liquid crystal during panel cutting and mounting processes becomes simple. As a result, the manufacturing time of liquid crystal panels is cut, and mounting defects are reduced.

Since the film is formed on one section of at least one substrate so as to provide a larger contact angle for a material sealed in the substrates on the film than the contact angle at a section where the film is not formed, the spread of the material is prevented.

The film is formed on the edge of the substrate, so that the film prevents the mixed material of liquid crystals and resin from being in contact with alignment marks.

The formation of the film on the edge of the display area prevents the mixed material of liquid crystals and resin from spreading.

Since thermoplastic resin is applied for the film, the fluidity of the thermoplastic resin can be increased by heating after the sealing resin is cured, so that the mixed material of liquid crystals and resin can spread to a sealing section.

In the manufacturing method of the invention, the phase-separation of the liquid crystals and the resin is carried out and the cut surface or one section of the cut surface of the substrates is sealed after the liquid crystal panel is cut. Thus, no water gets into the liquid crystal panel, and the substrates are sealed without applying sealing resin. As a result, the time for curing as well as manufacturing liquid crystal panels is significantly reduced.

DETAILED DESCRIPTION OF THE INVENTION

This invention will be described by referring to the following illustrative examples and attached figures.

EXAMPLE 1

Figure 1:
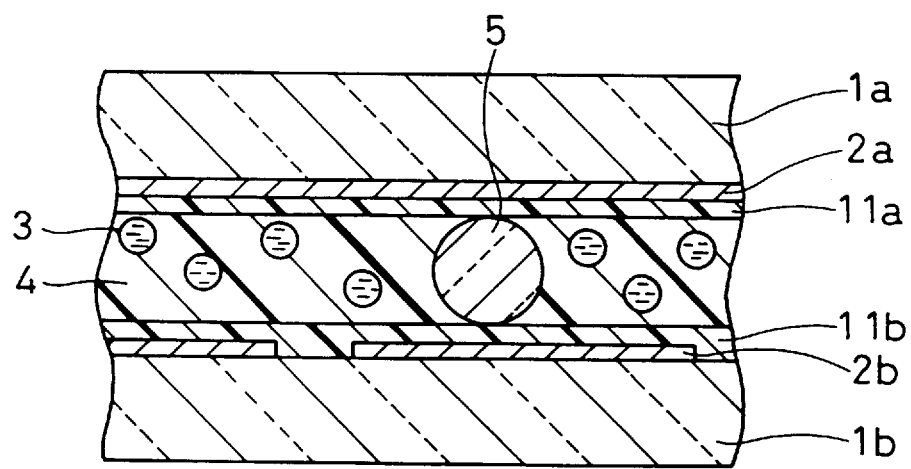
FIG. 1 is a cross-sectional view of a liquid crystal display panel of a first embodiment of the invention.

FIG. 1 is a cross-sectional view of a liquid crystal display panel of the first embodiment of the invention. As shown in FIG. 1, transparent conductive films 2a and 2b (made of indium-tin oxide alloy and mentioned as ITO films hereinafter) were formed on two transparent glass substrates 1a and 1b so as to form a preferable pattern. After washing glass substrates 1a and 1b, alignment layers (AL5417 manufactured by Japan Synthetic Rubber Co., Ltd.) were formed as insulating films 11a and 11b on the ITO films. The panel was heated for 30 minutes at 220° C. after it was heated at 80° C. for one minute.

As spacers 5, $SiO_2$ particles having a diameter of 13 μm and an adherence tendency (Sinsi ball AB-8-13 μm manufactured by Catalysts & Chemicals Industries Co., Ltd.) were applied on glass substrate 1a. Spacers 5 were adhered on substrate 1a after the substrate was left at 140° C. for 90 minutes. Since the spacers were fixed, they were prevented from being displaced by a dropped material.

On glass substrate 1b, a mixed material 6 was dropped in an amount greater than the amount needed to cover the display area when the substrates are sealed. The mixed material was made of 80% by weight of liquid crystals 3 having a diameter of about 1–2 μm (E-7 manufactured by British Drug House Ltd.), 1.8% by weight of polyester acrylate as photosetting resin 4, 18% by weight of 2-ethyl hexyl acrylate, and 0.2% by weight of photosetting initiator (Darocure 1173 manufactured by Merck Co.).

Figure 2A:
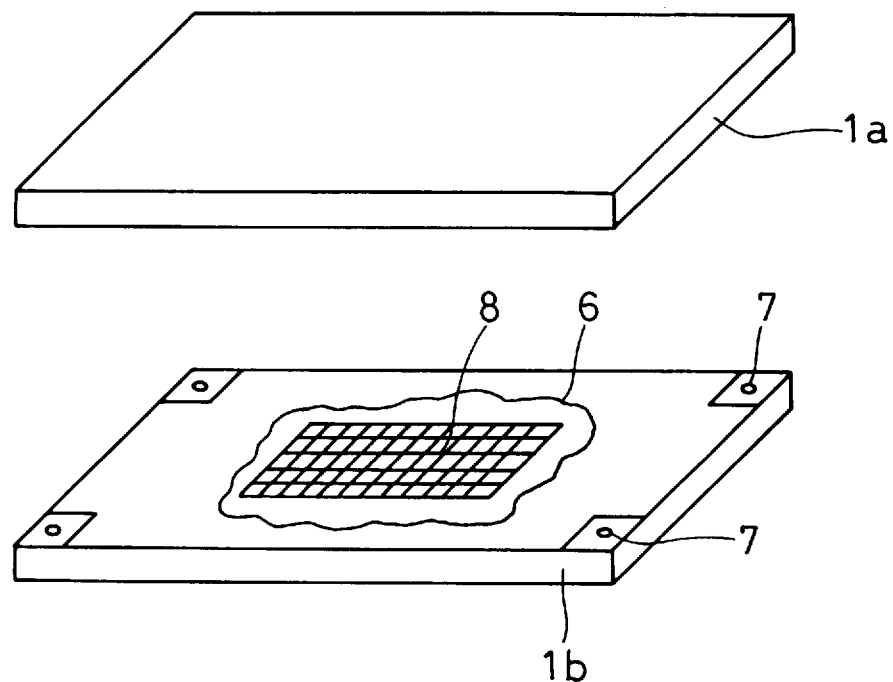
FIG. 2A is a perspective view of the liquid crystal display panel of the first embodiment, showing the method of manufacturing the panel.
Figure 2B:
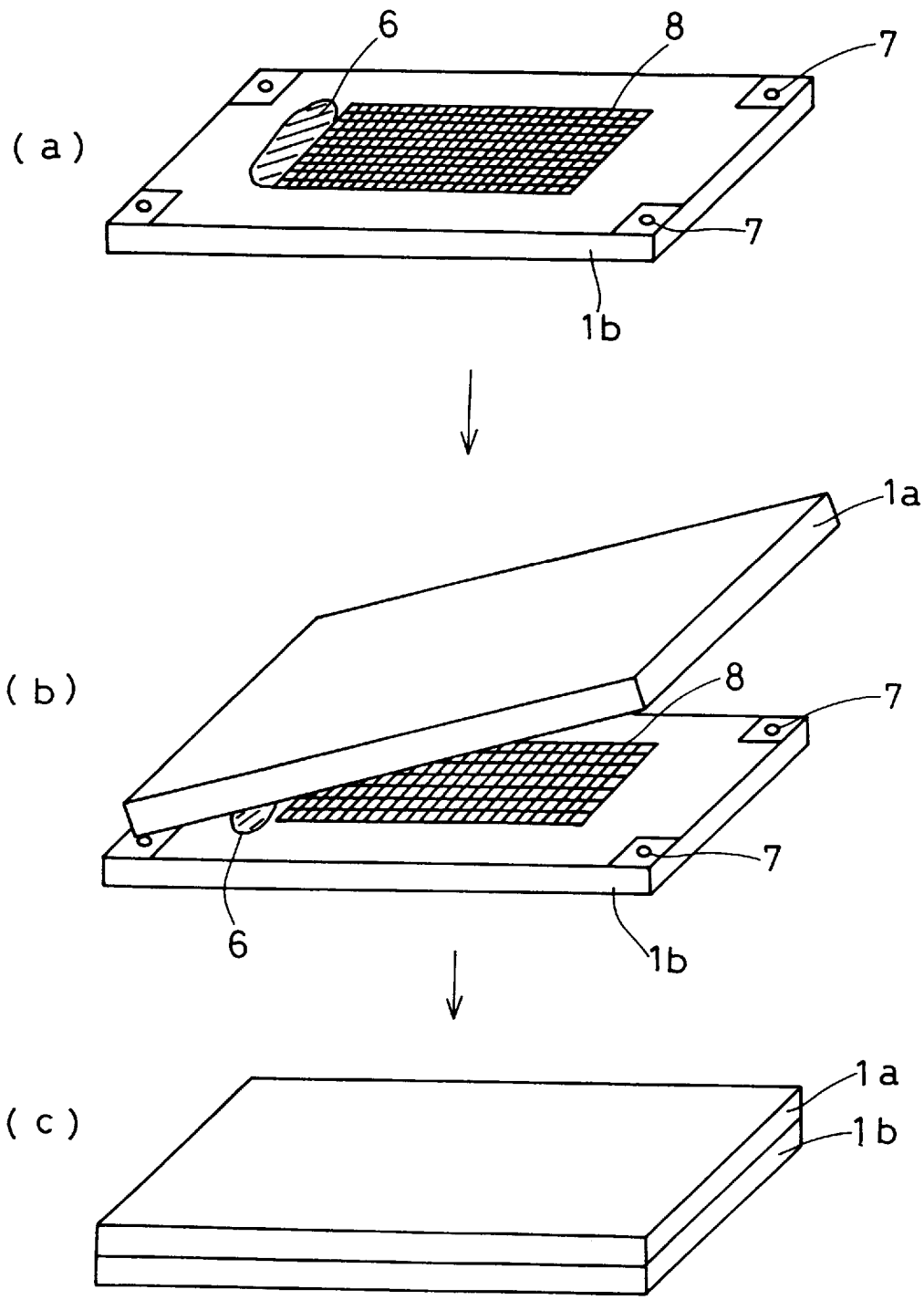
FIG. 2B is a perspective view of substrates, showing a process of adhering the substrates to each other.

Glass substrates 1a and 1b were adhered to each other so as to set transparent conductive films (ITO films) 2a and 2b facing each other. Although the substrates 1a, 1b may be adhered to each other after dropping the mixed material of liquid crystals and resin in the display area as shown in FIG. 2A, a panel with a better display quality without bubbles can be obtained by dropping the mixed material of liquid crystal and resin 6 outside the display area 8 of the substrate 1b as illustrated in FIGS. 2B(a) and 2C(a), putting an edge of the other substrate 1a on the substrate 1b and gradually inclining the substrate 1a along the substrate 1b as illustrated in FIGS. 2B(b) and 2C(b) since bubbles will be removed to the outside the pixel with the flow of the mixed material of liquid crystal and resin in this method. A diagram of the flow of the mixed material and the disappearance of the bubbles viewed from the panel plane are illustrated in FIG. 2D. The arrow in FIG. 2D shows the direction of the flow of the mixed material of liquid crystal and resin.

Figure 2C:
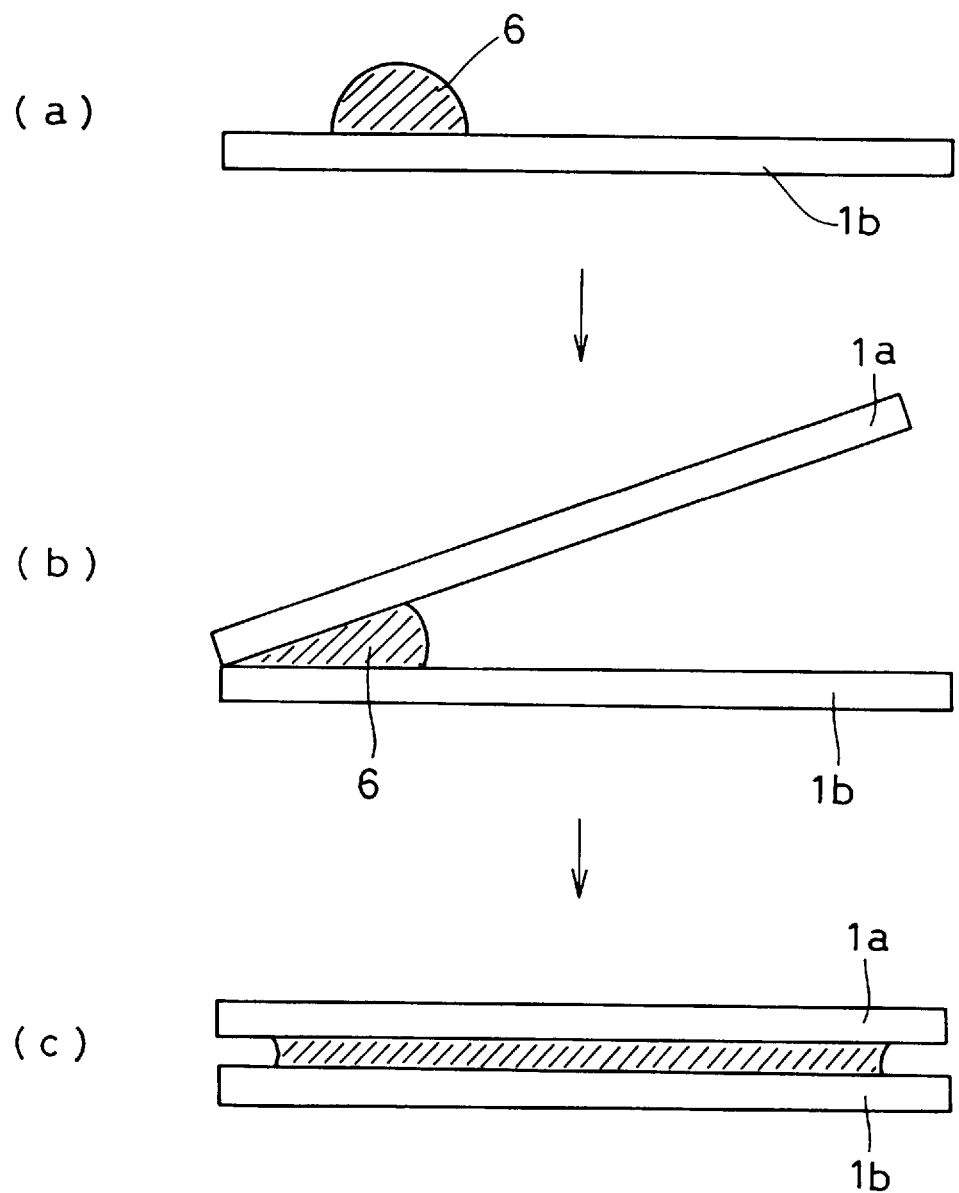
FIG. 2C is a cross-sectional view of substrates, showing a process of adhering the substrates to each other.
Figure 2D:
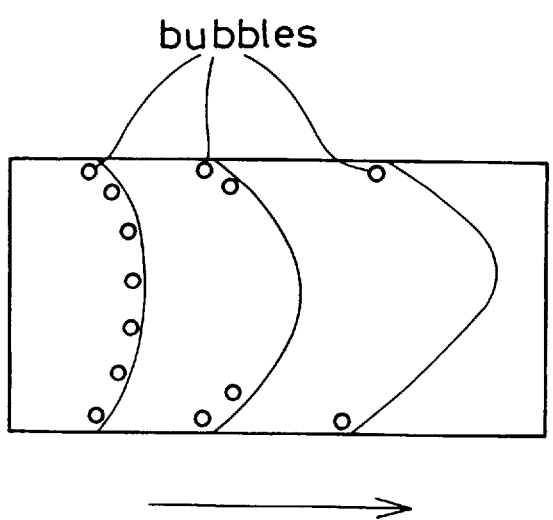
FIG. 2D is a diagram, showing the flow of a mixed material and the disappearance of bubbles.

As to the alignment of the substrates, an alignment mark 7 for aligning the substrates was formed at each edge of substrate 1b and outside a display area 8 as illustrated in FIGS. 2A, 2B and 2C. Substrates 1a and 1b were fixed to each other by aligning at these marks. Since mixed material 6 was dropped in an amount more than the amount sealed between substrates 1a and 1b, it protruded beyond display area 8.

Figure 3:
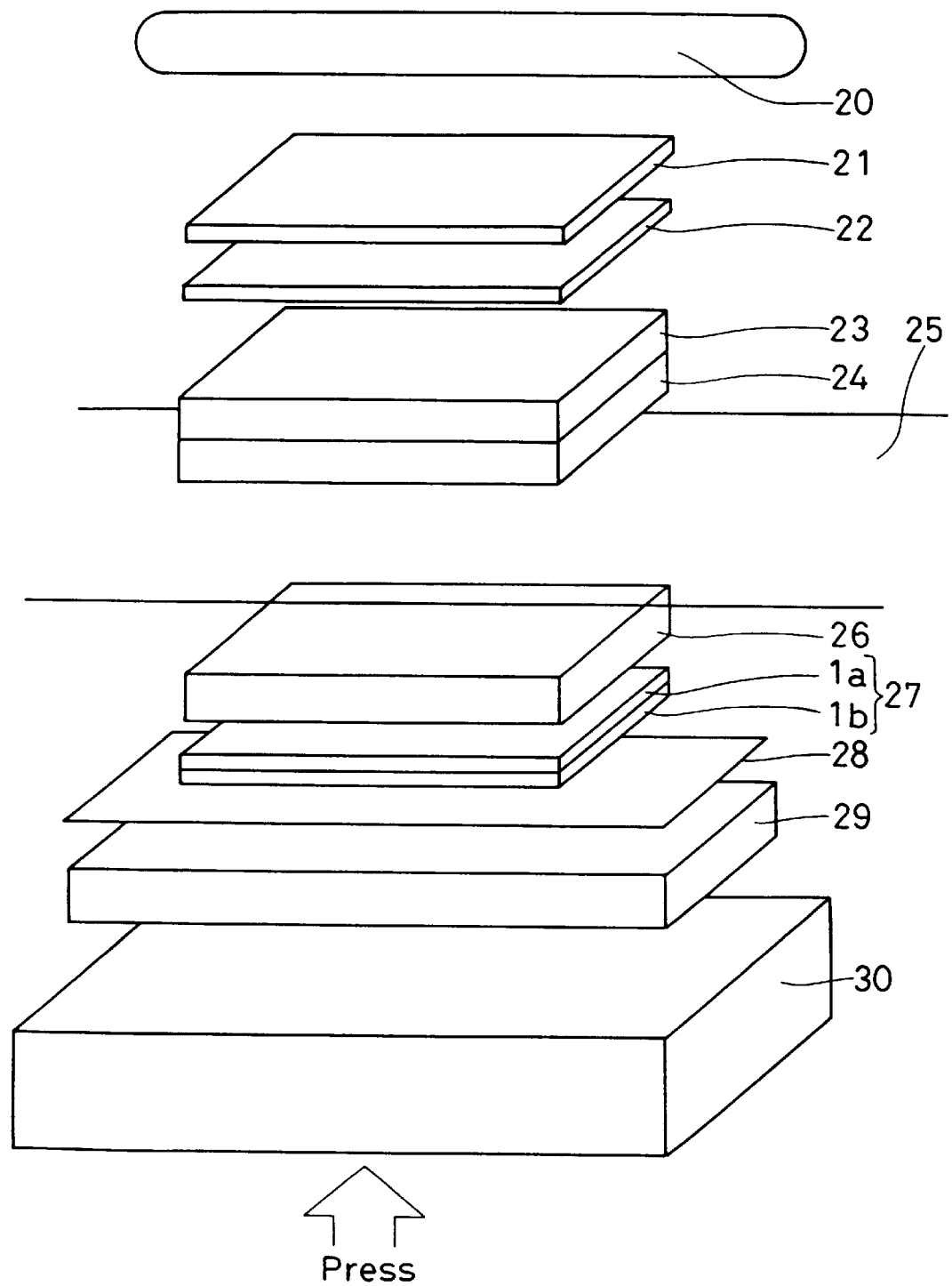
FIG. 3 is a view showing the method of manufacturing the liquid crystal display panel of the first embodiment of the invention.

As shown in FIG. 3, an "opal" diffusion glass plate (DFO-150S-1 manufactured by Sigma Koki Company Ltd. An "opal" diffusion glass plate comprises a transparent glass layer on which surface an opal glass layer including a photodiffusion material is affixed and it is well known in the art.) 26 was adhered to one substrate (on the side of light iraddiation) of a PDLC display panel 27 and was then placed on a reflector 28 made of aluminum or stainless steel so as to utilize reflection from the back surface. The reflector was placed on buffer 29 which was kept at 23° C. by a circulating thermostat 30.

In order to maintain a gap between the substrates, a light transmitting film sheet 25 was sandwiched between the reflector and a quartz plate 24, and 1 kg/cm$^2$ pressure was added to the surface of the liquid crystal display panel. On the light transmitting film 25, a circulating thermostat 23, made of a glass substrate in which water is circulating for keeping temperature constant, and quartz plate 24 for adding pressure were placed.

Furthermore, a heat absorbing (or reflecting) filter (for example, HAF-50S-30H manufactured by Sigma Koki Company Ltd.) 21 was placed so as to set the transmissivity of infrared rays (having 0.8 μm or more wavelength) at about zero %. An ultraviolet ray cutting filter (UV-35 manufactured by Toshiba Corporation) 22 was also placed so as to exclude ultraviolet rays having less than 350 nm wavelength and providing a negative effect on the liquid crystal transmission.

Then, the section except for the display area was shielded off from light, and light was irradiated onto the display area from the top substrate side with an ultra-high pressure mercury lamp (CHM-2000 manufactured by Oak Seisakusho Co., Ltd.) 20 while the panel was pressed from the bottom substrate with 1 kg/cm$^2$ pressure. The phase separation of the liquid crystals and the resin in the panel was carried out by irradiating light with 50 mW/cm$^2$ for five minutes, and the resin was cured. The panel was then cut along the display area circumference. The section except the display area was removed, and ultraviolet curing type resin (Locktite 352A manufactured by Locktite Japan Corporation) was coated along the cut surface. Ultraviolet rays were irradiated at 55 mW/cm$^2$ for ninety seconds, thus sealing the cut surface.

In this example, a mixture of liquid crystals and photosetting resin was dropped and was injected between substrates simply, without applying a complex vacuum deposition device. Unlike in the conventional method, it was unnecessary to take a liquid crystal panel into a high vacuum atmosphere, so that the time required for manufacturing was cut significantly. Since the photosetting resin was cured, sealing resin was not required to seal the cut surfaces of the substrate, thus reducing the time required for curing the resin.

Light was irradiated only to a display area, and the phase separation of liquid crystals and resin in the display area was then carried out. Thus, the panel was easily cut and washed during the mounting process.

EXAMPLE 2

Figure 4:
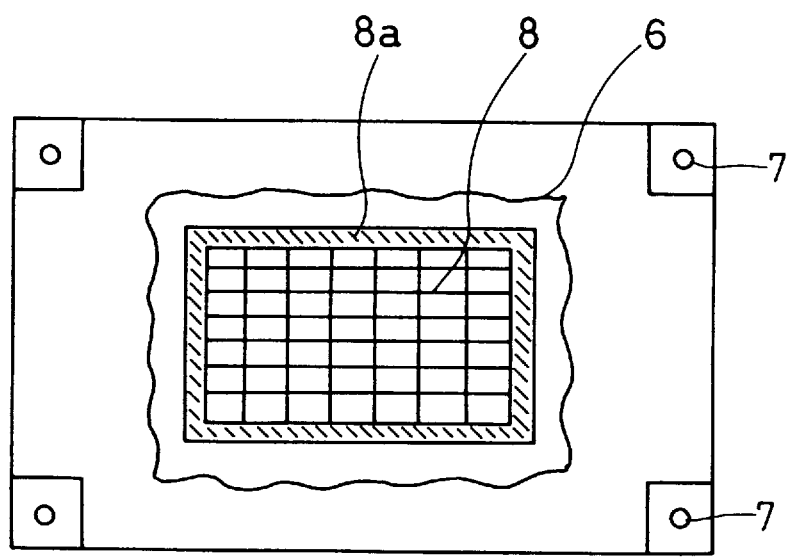
FIG. 4 is a plan view of a liquid crystal display panel of a second embodiment of the invention, showing the method of manufacturing the panel.

As in Example 1, a mixed material 6 of liquid crystals 3, photosetting resin 4 and photosetting initiator was dropped on a substrate 1b in an amount greater than the volume amount sealed between the substrates. The substrate was then fixed to the other substrate. As shown in FIG. 4, the section except the peripheral section of a display area was shut off from light, and light was irradiated only to pheripheral section 8a of the display area at 50 mW/cm$^2$ for five minutes, thus curing the resin. The shield at the display area was taken off, and light was irradiated to the area at 50 mW/cm$^2$ for five minutes. As a result, the phase separation of the liquid crystals and the resin was carried out, and the resin was cured at the same time. The liquid crystal display panel was then cut along the peripheral section of the display area. After removing the unnecessary section of the panel, ultraviolet curing type resin (Locktite 352A manufactured by Locktite Japan Corporation) was coated on the cut surface of the panel. Ultraviolet rays were irradiated to the resin at 55 mW/cm$^2$ for ninety seconds, thus sealing the cut surface. Since the mixed material of liquid crystals and resin outside the display area was applied as sealing resin in this example, it was unnecessary to form sealing resin in advance. In addition, the phase-separation in the display area was carried out after curing the peripheral section of the display area, so that a PDLC with a uniform panel gap was manufactured.

EXAMPLE 3

Figure 5:
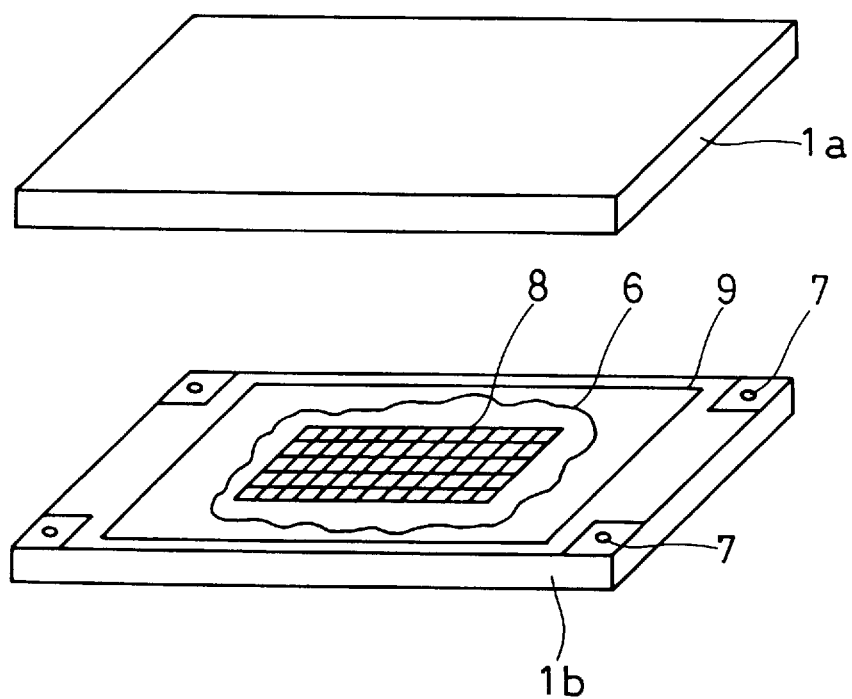
FIG. 5 is a perspective view of a liquid crystal display panel of a third embodiment of the invention, showing the method of manufacturing the panel.

Example 3 is explained by referring to FIG. 5. Transparent conductive films (ITO films) were formed on two transparent glass substrates 1a and 1b in preferable patterns. After washing glass substrates 1a and 1b, alignment layers (AL5417 manufactured by Japan Synthetic Rubber Co., Ltd.) were printed on the transparent conductive films (ITO films) as insulating films. The substrates were heated at 80° C. for one minute and then at 220° C. for thirty minutes.

On glass substrate 1a, SiO$_2$ particles having an adherence tendency and a diameter of 13 μm (Sinsi ball AB-8-13 μm manufactured by Catalysts & Chemicals Industries Co., Ltd.) were dispersed as spacers. The spacers were adhered to substrate 1a after leaving the substrate at 140° C. for ninety minutes, thus preventing the spacers from being displaced by dropped mixed material. Photo-setting resin was applied at the peripheral section of substrate 1b as seal 9. SiO$_2$ particles having diameter of 13 μm (Sinsi ball B-1 manufactured by Catalysts & Chemicals Industries Co., Ltd.) were mixed in the photosetting resin at 0.3% by weight as the spacers. A mixed material 6 was dropped on substrate 1b in an amount greater than the amount needed to cover the display area when the substrates are sealed. The mixed material includes 80% by weight of liquid crystals 3 (E-7 manufactured by British Drug House Ltd.), 1.8% by weight of polyester acrylate (photosetting resin 4), and 0.2% by weight of photosetting initiator (Darocure 1173 manufactured by Merck Co.). As shown in FIG. 5, the seal was applied at the peripheral section of the substrate, and mixed material 6 of the liquid crystals and resin was dropped inside the peripheral section.

Glass substrates 1a and 1b were adhered to each other, so that the transparent conductive films (ITO films) faced each other. As shown in FIG. 5, an alignment mark 7 for aligning the substrates was formed at each edge of the substrates outside display area 8. Substrates 1a and 1b were adhered to each other by matching the marks of substrate 1a to those of substrate 1b. Mixed material 6 was dropped between substrate 1a and 1b in an amount greater than the amount needed to cover the display area when the substrates are sealed, so that the material protruded outside the display area 8.

The phase separation of the liquid crystals and the resin inside the panel was carried out after irradiating light from the top substrate at 50 mW/cm$^2$ for five minutes while pressure at 1 kg/cm$^2$ was applied from the bottom substrate. The photosetting resin and seal resin 9 were cured at the same time. Then, the liquid crystal panel was cut along the peripheral section of the display area, and the unnecessary section of the panel was removed. Ultraviolet curing type resin (Locktite 352A manufactured by Locktite Japan Corporation) was coated on the cut surface, and ultraviolet rays were irradiated to the resin at 55 mW/cm$^2$ for ninety seconds so as to seal the cut surface.

Therefore, in this example, the mixed material of liquid crystals and photosetting resin was injected between the substrates simply, without applying a complex vacuum device. Since it was unnecessary to place the liquid crystal panel in a high vacuum atmosphere, the time required for manufacturing was significantly reduced. In addition, the seal was formed at the peripheral section of the substrate in advance, so that the substrates are matched precisely to each other.

EXAMPLE 4

Figure 6:
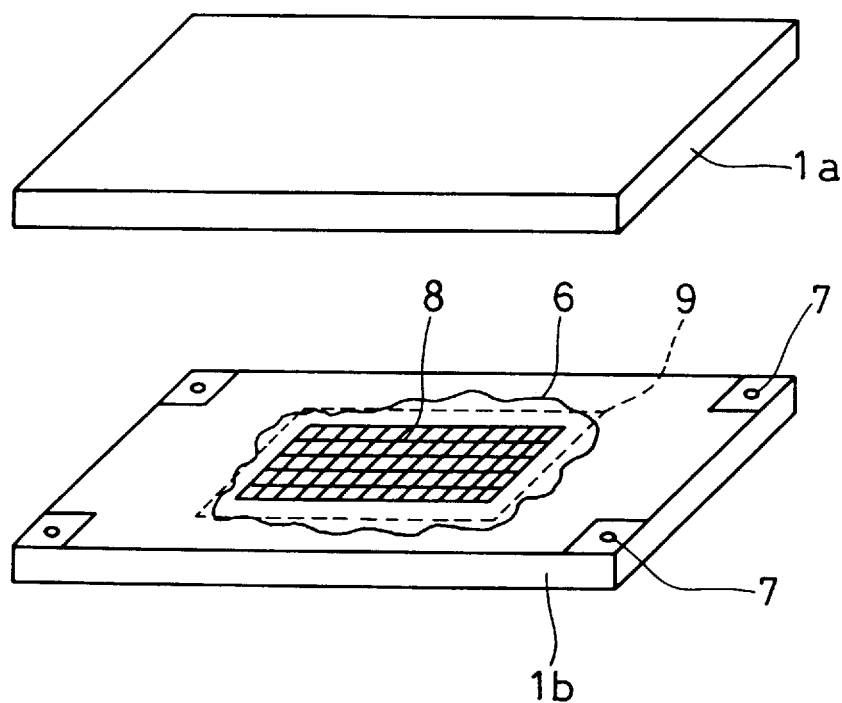
FIG. 6 is a perspective view of a liquid crystal display panel of a fourth embodiment of the invention, showing the method of manufacturing the panel.

As in Example 3, the insulating films were formed on substrates 1a and 1b. Adhesive spacers were scattered on substrate 1a, and a mixed material was applied on substrate 1b. The mixed material was prepared by mixing $SiO_2$ particles having a diameter of 13 μm (Sinsi ball B-13 μm manufactured by Catalysts & Chemicals Industries Co., Ltd.) as spacers in photosetting resin (sealing resin). As in FIG. 6, the seal was formed intermittently outside a picture element.

Glass substrates 1a and 1b were adhered to each other, so that transparent conductive films (ITO films) faced each other. An alighment mark 7 for aligning the substrates was formed at each edge of the substrates outside display area 8. By matching the marks of substrate 1a to those of substrate 1b, substrates 1a and 1b were adhered to each other. Since mixed material 6 of liquid crystals and resin was dropped in an amount greater than the amount needed to cover the display area when the substrates are sealed, the mixed material protruded to outside display area 8. The seal was formed intermittently, so that some material protruded outside the seal, and it was unnecessary to measure the amount of mixed material 6 precisely.

Then, the phase separation of the liquid crystals and resin in the panel was carried out by irradiating light at 50 mW/cm² from the top substrate for five minutes while pressure at 1 kg/cm² was applied from the bottom substrate. The resin was cured at the same time. The panel was then cut along the peripheral section of the display area, and the unnecessary section of the panel was removed. Ultraviolet curing type resin (Locktite 352A manufactured by Locktite Japan Corporation) was coated on the cut surface of the substrates, and ultraviolet rays were irradiated to the resin at 55 mW/cm² for ninety seconds so as to seal the cut surface.

In this example, the mixed material of the liquid crystals and photocuring resin was easily injected into the substrates without applying a complex vacuum device. Unlike in the conventional method, it was unnecessary to place the liquid crystal in high vacuum atmosphere, so that the time required for manufacturing was significantly cut. By forming the seal intermittently outside a picture element, the liquid crystal panel with a uniform gap was provided.

EXAMPLE 5

Figure 7:
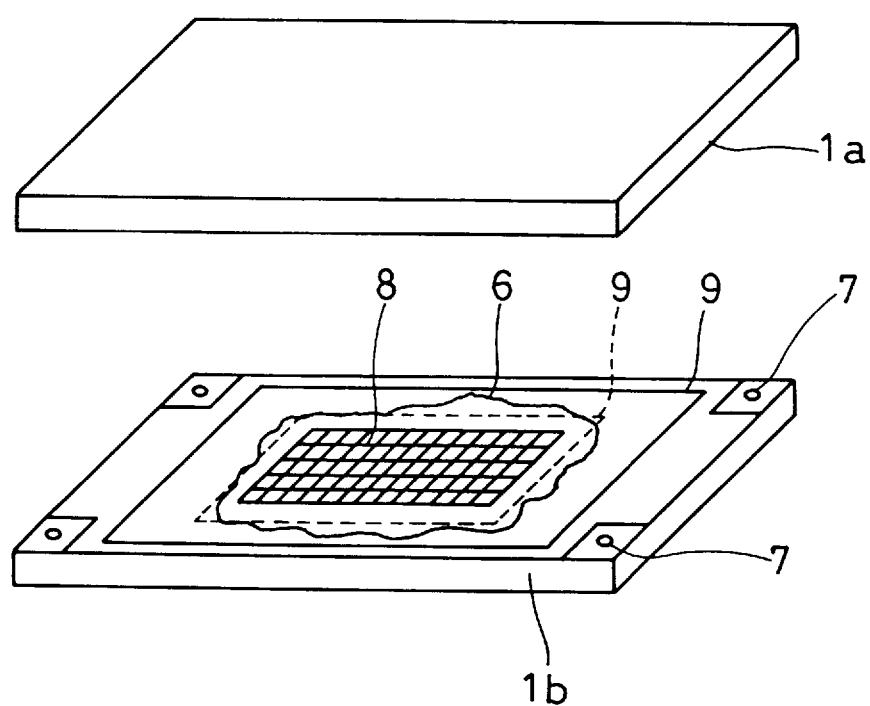
FIG. 7 is a perspective view of a liquid crystal display panel of a fifth embodiment of the invention, showing the method of manufacturing the panel.

As in Example 3, insulating films were formed on substrates 1a and 1b. On substrate 1a, adhesive spacers 5 were scattered. On substrate 1b, a mixed material was intermittently applied outside a picture element and was continuously applied at the peripheral section of the substrate as a seal (FIG. 7). The mixed material was prepared by mixing 0.3% by weight of $SiO_2$ particles having a diameter of 13 μm (Sinsi B-13 μm manufactured by Catalysts & Chemicals Industries Co., Ltd.) as spacers in photosetting resin (sealing resin).

Glass substrates 1a and 1b were adhered to each other, so that the transparent conductive films (ITO films) faced each other. As shown in FIG. 7, an alignment mark 7 for aligning the substrates was formed at each edge of the substrates outside display area 8, and the alignment marks of substrate 1a were matched with those of substrate 1b, thus fixing the substrates. Since mixed material 6 of liquid crystals and resin was dropped in an amount greater than the amount needed to cover the display area when the substrates are sealed, the material protruded outside display area 8. The seal was intermittently formed, so that the mixed material also protruded outside the seal, and it was unnecessary to measure the amount of mixed material 6 sealed between the substrates.

The phase-separation of the liquid crystals and resin inside the panel was carried out by irradiating light at 50 mW/cm² for five minutes from the top substrate while pressure at 1 kg/cm² was applied from the bottom substrate. The resin was cured at the same time. The plate was then cut along the peripheral section of the display area, and the unnecessary section of the plate was removed. Ultraviolet curing type resin (Locktite 352A manufactured by Locktite Japan Corporation) was coated on the cut surface of the substrates, and ultraviolet rays were irradiated to the resin at 55 mW/cm² for ninety seconds, thus sealing the cut surface.

In this example, the mixed material of liquid crystals and photosetting resin was injected between the substrates simply by dropping the material without applying a complex vacuum device. It was unnecessary to place the liquid crystal panel in a high vacuum atmosphere, so that the time required for manufacturing was significantly cut. Since the seal was formed intermittently outside the picture element, a liquid crystal panel with a uniform gap was provided. The seal was formed at the peripheral section of the substrates in advance, so that the substrates were precisely matched to each other.

EXAMPLE 6

Figure 8:
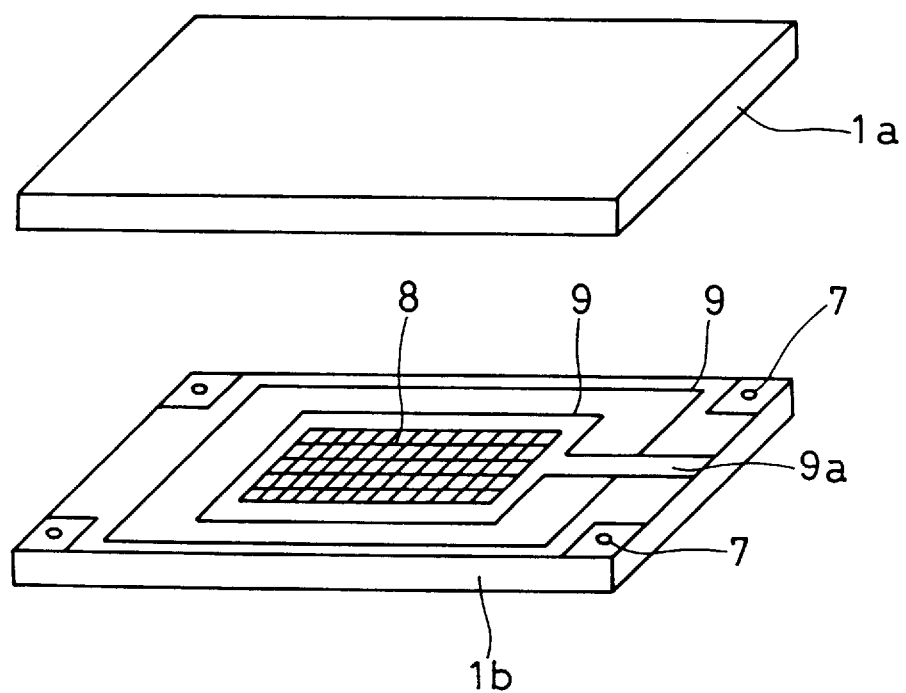
FIG. 8 is a perspective view of a liquid crystal display panel of a sixth embodiment of the invention, showing the method of manufacturing the panel.

As in Example 3, insulating films were applied on substrates 1a and 1b. On substrate 1a, adhesive spacers were applied. On substrate 1b, a mixed material was applied outside a picture element and at the peripheral section of the substrate as a seal (FIG. 8). The mixed material was prepared by adding 0.3% by weight of $SiO_2$ particles having a diameter of 13 μm (Sinsi Ball B-13 μm manufactured by Catalysts & Chemicals Industries Co., Ltd.) as spacers in photosetting resin (seal resin). A part of the seal was applied as a guide path 9a for outflowing excess mixed material to the outside.

Glass substrates 1a and 1b were adhered to each other, so that the transparent conductive films (ITO films) faced each other. As shown in FIG. 8, an alignment mark 7 for aligning the substrates was formed at each edge of the substrates outside display area 8. Thus, the marks of substrate 1a were matched to the marks of substrate 1b. Since the mixed material of liquid crystals and resin was dropped in an amount greater than the amount needed to cover the display area when the substrates are sealed, the material protruded outside display area 8 through the guidel path 9a.

The phase-separation of the liquid crystals and resin inside the panel was carried out by irradiating light at 50 mW/cm² for five minutes from the top substrate while pressure at 1 kg/cm² was applied from the bottom substrate. The resin was cured at the same time. The liquid crystal display panel was cut along the peripheral section of the display area, and the unnecessary section of the panel was removed. Ultraviolet curing type resin (Locktite 352A manufactured by Locktite Japan Corporation) was coated on the cut surface of the substrates, and ultraviolet rays were irradiated to the resin at 55 mW/cm² for ninety seconds, thus sealing the cut surface.

In this example, the mixed material of liquid crystals and photosetting resin was injected between the substrates simply, by dropping the material without applying a complex vacuum device. Unlike in the conventional method, it was unnecessary to place the liquid crystal panel in a high vacuum atmosphere, so that the time required for manufacturing was significantly cut. Since the guide path was formed, mixed material flowed out of the picture element. However, since the substrates were fixed by an outside seal, they were matched precisely to each other.

EXAMPLE 7

Figure 9:
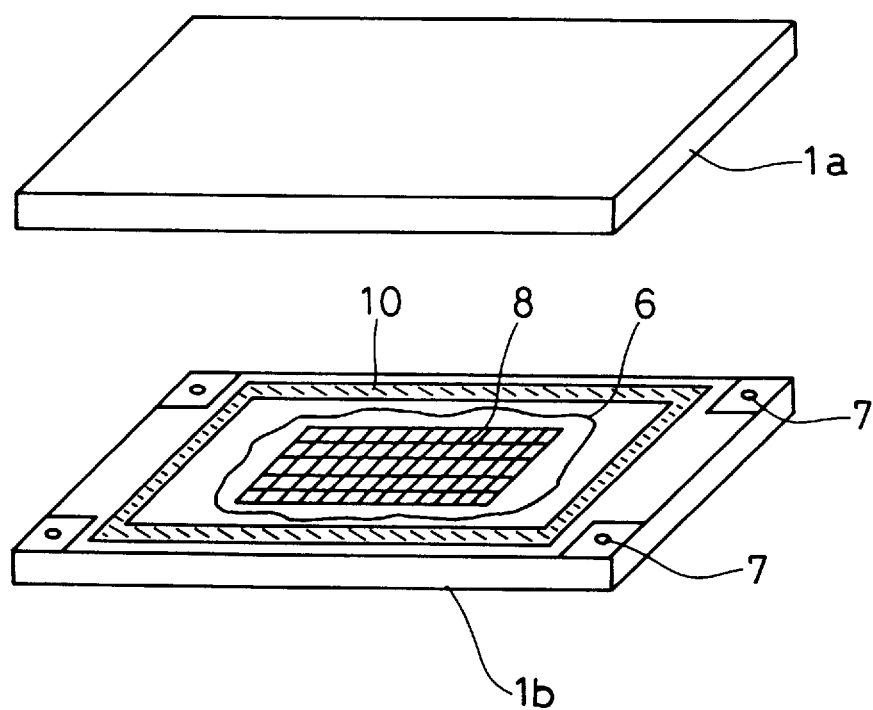
FIG. 9 is a perspective view of a liquid crystal display panel of a seventh embodiment of the invention, showing the method of manufacturing the panel.

Example 7 is explained by referring to FIG. 9. As in Example 1, transparent conductive films (ITO films) were formed on two glass substrates 1a and 1b. After washing glass substrates 1a and 1b, SiO$_2$ particles having a diameter of 13 μm were scattered on glass substrate 1a as spacers. As in the figure, an aqueous solution including 6% by weight of polyurethane as thermoplastic resin 10 (for example, MS6500 manufactured by Mitsubishi Heavy Industries, Ltd.) was printed at the edge of glass substrate 1b. Then, the substrate was heated at 80° C. for one hour, thus forming a film. On glass substrate 1b, a mixed material 6 was dropped. The mixed material was made of 80% by weight of liquid crystals (E-7 manufactured by British Drug House Ltd.), 1.8% by weight of polyester acrylate as photosetting resin, 18% by weight of 2-ethyl hexyl acrylate, and 0.2% by weight of photosetting initiator (Darocure 1173 manufactured by Merck Co.).

Glass substrates 1a and 1b were adhered to each other, so that the transparent conductive films (ITO films) were facing to each other. An alignment mark 7 was formed at each edge of the substrates outside the display area. The marks of substrate 1a and those of substrate 1b were matched to each other, thus aligning substrate 1a to substrate 1b. Since the mixed material of the liquid crystals and resin was dropped in an amount greater than the amount needed to cover the display area when the substrates are sealed, the material protruded outside the display area. Thermoplastic resin 10 was formed at the edge of glass substrate 1b. The wettability of mixed material 6 relative to thermoplastic resin 10 was poor (the contact angle was large), so that mixed material 6 did not come in contact with alignment marks 7 and precise alignment became possible. The section except for the display area of the panel was shielded from light, and light at 50 mW/cm$^2$ was irradiated only to the display area for five minutes. As a result, the phase-separation of the liquid crystals and resin in the panel was carried out, and the resin was also cured. The panel was cut along the peripherial section of the display area, and the unnecessary section was removed.

Ultraviolet curing type resin (Locktite 352A manufactured by Locktite Japan Corporation) was coated on the cut surface of the panel, and ultraviolet rays were irradiated to the cut surface at 55 mW/cm$^2$ for ninety seconds to seal the cut surface.

In this example, the mixed material of liquid crystals and resin was prevented from being in contact with the alignment marks since the thermoplastic resin was formed at the edge of the substrates.

Even though thermoplastic resin 10 was continuously formed at the peripheral section (outside) of glass substrate 1b in this example, thermoplastic resin may be formed only at alignment marks 7. The thermoplastic resin is not limited to the polyurethane type, and can be a polystyrene type, polyamide type, polyvinyl chloride type, or polyethylene type. In other words, as long as the mixed material of liquid crystals and resin has a contact angle on the thermoplastic resin that is larger than a contact angle on the center of the display area, the resin can be used in the invention.

EXAMPLE 8

Figure 10:
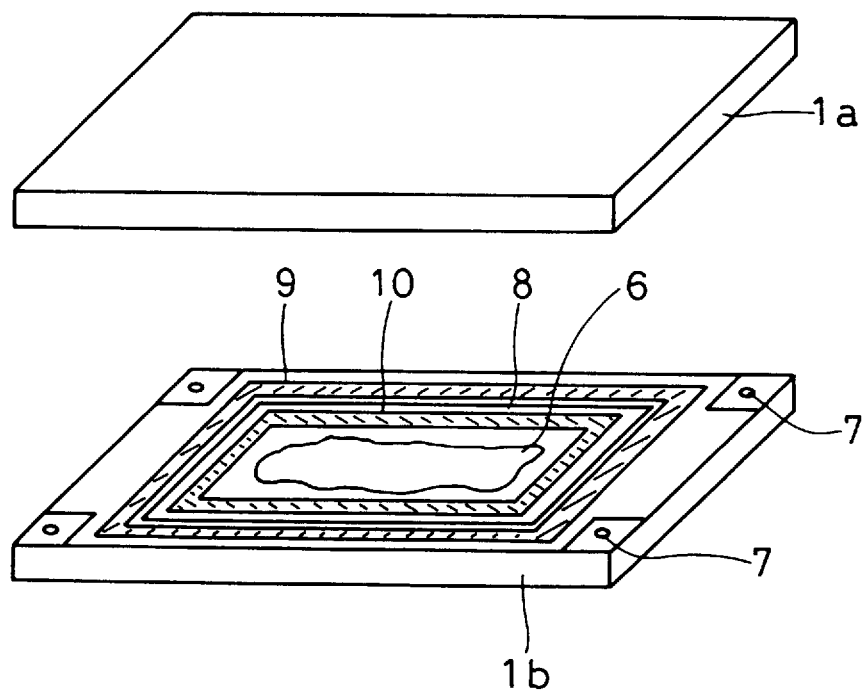
FIG. 10 is a perspective view of a liquid crystal display panel of an eighth embodiment of the invention, showing the method of manufacturing the panel.

Example 8 is explained by referring to FIG. 10. As in Example 1, transparent conductive films (ITO films) were formed on two transparent glass substrates 1a and 1b. After washing glass substrates 1a and 1b, SiO$_2$ particles having a diameter of 13 μm were dispersed as spacers 5 on glass substrate 1a. Then, as shown, in FIG. 10 an aqueous solution containing 6% by weight of polyurethane was printed as thermoplastic resin 10 (MS6500 manufactured by Mitsubishi Heavy Industries, Ltd.) at the edge of the display area on glass substrate 1b, and was treated with heat at 80° C. for one hour, thus forming a film. Ultraviolet curing resin was then printed as seal resin 9 at the edge of glass substrate 1b.

A mixed material 6 was dropped on glass substrate 1b. The mixed material includes 80% by weight of E-7 (manufactured by British Drug House Ltd.) as liquid crystals, 1.8% by weight of polyester acrylate, and 0.2% by weight of photosetting initiator (Darocure 1173 manufactured by Merck Co.).

Glass substrates 1a and 1b were fixed, so that the transparent conductive films (ITO films) faced each other. Since thermoplastic resin 10 was formed inside seal resin 9, mixed material 6 did not come in contact with seal resin 9 after fixing the substrates to each other, thus preventing impurities in seal resin 9 from entering mixed material 6.

Then, display area 8 of the panel was shielded from light. Ultraviolet rays were irradiated to seal resin 9, thus curing seal resin 9. The panel was then heated at 80° C. for one hour, so that the fluidity of thermoplastic resin 10 increased and mixed material 6 was dispersed. The shield object was removed, and light at 50 mW/cm$^2$ was irradiated to the panel for five minutes, so that the phase-separation of the liquid crystals and resin was carried out and the resin was cured.

In this example, the spread of the mixed material before pressing the panel was prevented by applying the thermoplastic resin at the peripheral section of the display area. The sealing resin was formed outside the display area in this example. However, the panel may be prepared in the following steps:

dropping the mixed material of the liquid crystals and resin;

fixing the substrates to each other;

irradiating light only to the display area;

carrying out the phase-separation of the liquid crystals and resin; and sealing the cut surface of the substrates.

Thus, if thermoplastic resin is formed inside the display area, the mixed material is prevented from being in contact with the alignment marks.

EXAMPLE 9

Example 9 is explained by referring to FIG. 11. As in Example 1, transparent conductive films (ITO films) were formed on two transparent glass substrates 1a and 1b. After washing glass substrates 1a and 1b, SiO$_2$ particles having a diameter of 13 μm were scattered on substrate 1a as spacers. As shown in FIG. 11A, a mixed material 6 was dropped on glass substrate 1b. The mixed material included 80% by weight of liquid crystals 3 (E-7 manufactured by British Drug House Ltd.), 1.8% by weight of polyester acrylate as photosetting resin 4, 18% by weight of 2-ethyl hexyl acrylate, and 0.2% by weight of photosetting initiator (Darocure 1173 manufactured by Merck Co.).

Figure 11A:
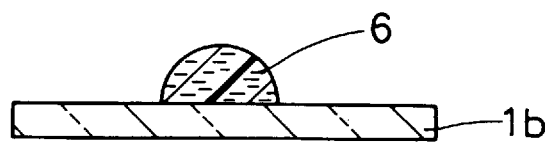
FIG. 11A is a cross-sectional view of a liquid crystal display panel of a ninth embodiment of the invention, showing a drop of mixed material of liquid crystal and photo-curing resin on one glass substrate.
Figure 11B:
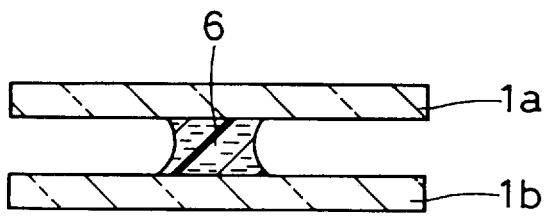
FIG. 11B is a cross-sectional view of the liquid crystal display panel showing two glass substrates placed so that transparent conductive films face each other.
Figure 11C:
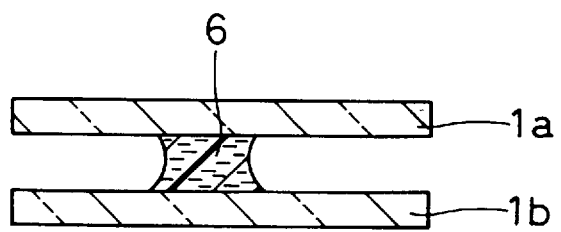
FIG. 11C is a cross-sectional view of the liquid crystal display panel showing polymer dispersed liquid crystal (PDLC) being in contact with substrates while the inside panel is depressurized.
Figure 11D:
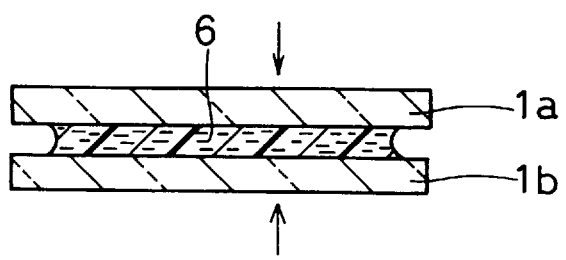
FIG. 11D is a cross-sectional view of the liquid crystal display panel showing the substrates fixed to each other.
Figure 12A:
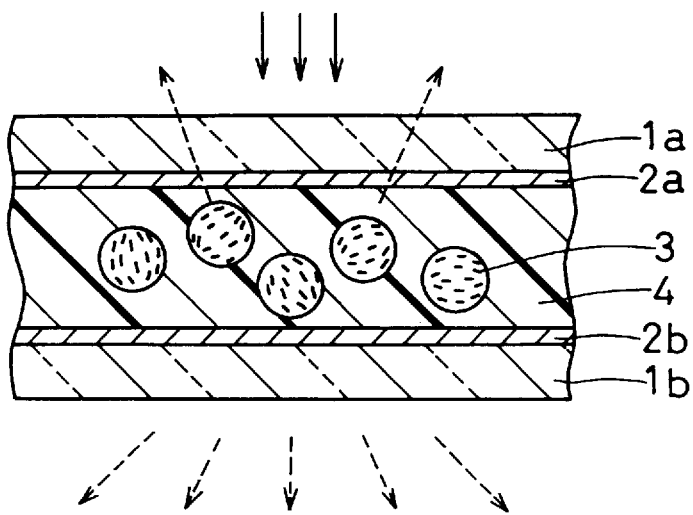
FIG. 12A is a cross-sectional view of a conventional polymer dispersed liquid crystal (PDLC) display panel showing a light scattering condition.
Figure 12B:
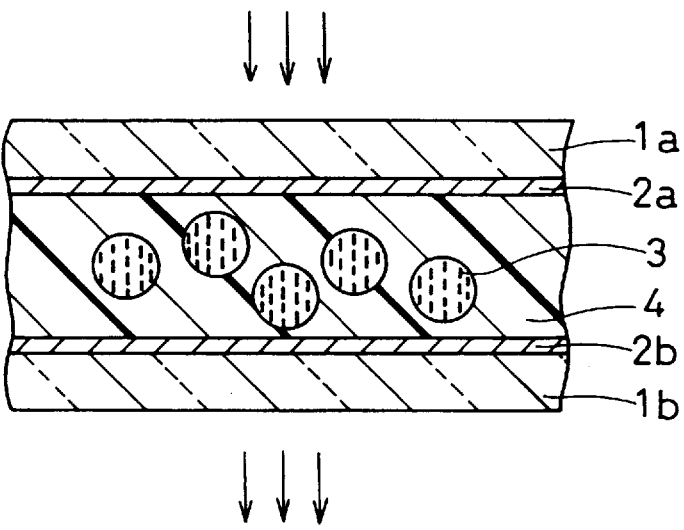
FIG. 12B is a cross-sectional view of the conventional PDLC display panel showing a light transmitting condition.

Glass substrates 1a and 1b were set so as to face the transparent conductive films (ITO films) toward each other (FIG. 11B). The inside of the panel was depressurized to 1 Torr while PDLC was set in contact with one substrate (FIG. 11C). The substrates were fixed to each other (FIG. 11D). As in Example 1, an alignment mark for fixing the substrates was formed at each edge of substrates 1a and 1b. The marks of substrate 1a were matched to the marks of substrate 1b.

The section except the display area was shielded from light, and light at 50 mW/cm² was irradiated to the display area for five minutes. As a result, the phase-separation of the liquid crystals and resin in the panel was carried out, and the resin was then cured at the same time.

The panel was cut along the peripheral section of the display area, and the unnecessary section was removed. Ultraviolet curing type resin (Locktite 352A manufactured by Locktite Japan Corporation) was coated on the cut surface of the substrates, and ultraviolet rays were irradiated to the resin at 55 mW/cm² for ninety seconds so as to seal the cut surface.

In this example, a panel of high quality with no air bubbles was provided since the pressure inside the panel was depressurized to 1 Torr. Since the pressure inside the panel was reduced while the mixed material was in contact with the substrate, the area where the mixed material contacts the atmosphere was small. Therefore, it was possible to apply a highly volatile material in a vacuum.

The mixed material of polyester acrylate and 2-ethyl hexyl acrylate was applied as photosetting resin in this example. However, 2-hydroxy ethyl acrylate or trimethylol propanetriacrylate may also be used in this invention. Besides the photosetting resin, thermosetting resin or thermoplastic resin may be applied and may be reacted with heat. As the liquid crystals, E-8 (manufactured by British Drug House Ltd.), ZLI4792 (manufactured by Merck Co.), or TL202 (manufactured by Merck Co.) may be used instead. Irgacure 184 (manufactured by Chiba-Geigy Co.) or Irgacure 651 (manufactured by Chiba-Geigy Co.) can be used as a polymerization initiator. In other words, this invention is effective without being dependent on liquid crystal materials and resin materials. In addition to a photosetting agent, a thermosetting agent or an agent curing at ordinary temperature may be applied as a sealing agent. An active matrix substrate having an active element can be applied as one of the substrates. Even though insulating films were formed on the substrate surface, the films need not be formed in this invention.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A liquid crystal display panel comprising a pair of substrates, resin, liquid crystals and a film, wherein said resin and said liquid crystals are sandwiched between said substrates, wherein said film is formed on one section of one of said substrates, wherein said film does not seal the pair of substrates, wherein a material comprising said resin and said liquid crystals has a contact angle on said film larger than a contact angle on a section where said film is not formed, and wherein said resin and said liquid crystals are in a phase-separation state.

2. The liquid crystal display panel of claim 1, wherein the film is formed on an edge of one of the substrates.

3. The liquid crystal display panel of claim 1, wherein the film is formed on an edge of a display area for the display panel.

4. The liquid crystal display panel of claim 1, wherein the film comprises thermoplastic resin.

5. The liquid crystal display panel of claim 1, wherein the resin and the liquid crystals are put in a phase-separation state by irradiating light while pressure is added to at least one of the substrates.

6. The liquid crystal display panel of claim 1, wherein the resin is photosetting resin.

* * * * *